US010063771B2

(12) United States Patent
Ohashi

(10) Patent No.: US 10,063,771 B2
(45) Date of Patent: *Aug. 28, 2018

(54) ELECTRONIC DEVICE AND FUNCTION ASSIGNING METHOD

(71) Applicant: Sony Corporation, Tokyo (JP)

(72) Inventor: Hisashi Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 250 days.

This patent is subject to a terminal disclaimer.

(21) Appl. No.: 14/638,461

(22) Filed: Mar. 4, 2015

(65) Prior Publication Data

US 2015/0241988 A1    Aug. 27, 2015

Related U.S. Application Data

(63) Continuation of application No. 12/929,157, filed on Jan. 5, 2011, now Pat. No. 8,990,730, which is a
(Continued)

(30) Foreign Application Priority Data

Mar. 17, 2004    (JP) ................................ 2004-075676

(51) Int. Cl.
G06F 3/023    (2006.01)
H04N 5/232    (2006.01)

(52) U.S. Cl.
CPC ........ H04N 5/23225 (2013.01); G06F 3/0238 (2013.01); H04N 5/23216 (2013.01); H04N 5/23293 (2013.01)

(58) Field of Classification Search
CPC ..... G06F 3/0238; G06F 3/0484; G06F 3/0482
(Continued)

(56) References Cited

U.S. PATENT DOCUMENTS 4,523,298 A * 6/1985 Sakurai ................. H03M 11/04
341/23
5,086,503 A   2/1992 Chung et al.
(Continued)

FOREIGN PATENT DOCUMENTS

EP    1 164 770 A2    12/2001
EP    1 398 959 A2    3/2004
(Continued)

OTHER PUBLICATIONS

International Search Report for International Application No. PCT/ 2005/003557 dated May 10, 2005.
(Continued)

Primary Examiner — Daeho D Song
(74) Attorney, Agent, or Firm — Michael Best & Friedrich LLP

(57) ABSTRACT

At step ST2, an assign key changing item is selected from menu items. At step ST3, an assign key to which a function is assigned is selected. At step ST4, a function to be assigned is selected. The selected function is assigned to the selected assign key. At step ST5, a setting result indication screen appears. When one of two paired functions is assigned, a message which prompts a user to assign the other function. After the message has appeared for a predetermined time, the latest assigned states appear. At step ST6, the latest assign key information is stored to a non-volatile memory. To quit an assigning process, a menu button 8 is pressed and the menu is closed (at step ST8).

19 Claims, 7 Drawing Sheets

Related U.S. Application Data continuation of application No. 10/593,061, filed as application No. PCT/JP2005/003557 on Feb. 24, 2005, now abandoned.

(58) Field of Classification Search
USPC .................................... 715/827, 840, 847
See application file for complete search history.

(56) References Cited

U.S. PATENT DOCUMENTS

| | | | |
|---|---|---|---|
| 5,119,413 A * | 6/1992 | Okumura | H04M 1/2472 379/156 |
| 5,212,811 A | 5/1993 | Kuge et al. | |
| 5,258,748 A | 11/1993 | Jones | |
| 5,655,305 A | 8/1997 | Fletcher | |
| 5,745,809 A * | 4/1998 | Kawahata | G03B 17/18 396/287 |
| 5,956,655 A | 9/1999 | Suzuki et al. | |
| 6,285,357 B1 * | 9/2001 | Kushiro | G06F 3/0362 345/168 |
| 6,567,627 B2 | 5/2003 | Maeda et al. | |
| 6,600,700 B1 | 7/2003 | Machida et al. | |
| 6,850,282 B1 * | 2/2005 | Makino | H04N 5/23203 348/370 |
| 7,103,388 B2 | 9/2006 | Scott | |
| 7,106,375 B2 | 9/2006 | Venturino et al. | |
| 7,139,642 B2 | 11/2006 | Kamoto et al. | |
| 7,159,191 B2 | 1/2007 | Koivuniemi | |
| 7,167,729 B1 | 1/2007 | Kimura | |
| 7,194,700 B2 | 3/2007 | Fang | |
| 7,319,490 B2 | 1/2008 | Kanamori et al. | |
| 7,403,189 B2 | 7/2008 | Brebisson | |
| 8,019,388 B2 | 9/2011 | Chiam et al. | |
| 8,020,096 B2 | 9/2011 | Pagan | |
| 2001/0005229 A1 | 6/2001 | Misawa et al. | |
| 2001/0014214 A1 | 8/2001 | Hayashi et al. | |
| 2001/0026263 A1 * | 10/2001 | Kanamori | H04N 5/23293 345/156 |
| 2001/0040562 A1 * | 11/2001 | Masudaya | H01H 13/807 345/173 |
| 2001/0047302 A1 | 11/2001 | Yoshinaga et al. | |
| 2001/0053708 A1 | 12/2001 | Sugiyama et al. | |
| 2002/0007487 A1 | 1/2002 | Matsumoto et al. | |
| 2002/0015598 A1 * | 2/2002 | Maeda | H04N 1/00352 399/81 |
| 2002/0030754 A1 | 3/2002 | Sugimoto | |
| 2002/0101406 A1 | 8/2002 | Tseng | |
| 2002/0112248 A1 | 8/2002 | Takagi et al. | |
| 2002/0135619 A1 | 9/2002 | Allport | |
| 2002/0136563 A1 | 9/2002 | Maeda et al. | |
| 2002/0177464 A1 | 11/2002 | Swerup et al. | |
| 2003/0004862 A1 | 1/2003 | Lutnick et al. | |
| 2003/0090466 A1 | 5/2003 | Kuo | |
| 2003/0163088 A1 | 8/2003 | Blomquist | |
| 2003/0214664 A1 | 11/2003 | Moffatt | |
| 2004/0051741 A1 | 3/2004 | Venturino | |
| 2004/0059202 A1 | 3/2004 | Mori | |
| 2004/0069778 A1 | 4/2004 | Chun | |
| 2004/0153211 A1 | 8/2004 | Kamoto et al. | |
| 2004/0189591 A1 | 9/2004 | Du Breuil | |
| 2004/0233316 A1 | 11/2004 | Battles et al. | |
| 2004/0255271 A1 | 12/2004 | Lim | |
| 2005/0030290 A1 | 2/2005 | Brebisson | |
| 2005/0212979 A1 | 9/2005 | Morita et al. | |
| 2006/0209035 A1 | 9/2006 | Jenkins et al. | |
| 2007/0094616 A1 | 4/2007 | Won et al. | |

FOREIGN PATENT DOCUMENTS

| | | |
|---|---|---|
| JP | 06-060078 A | 3/1994 |
| JP | 11-281064 | 10/1999 |
| JP | 2001-352497 A | 12/2001 |
| JP | 2002-354170 A | 12/2002 |
| JP | 2003-029893 A | 1/2003 |

OTHER PUBLICATIONS

Japanese Office Action for Japanese Patent Application No. 2004-075676 (Japan).
Austrian Patent Office—Search Report and Written Opinion of Austrian Application No. 200606432-3 dated Oct. 10, 2008 (Austria).
Supplementary European Search Report under Article 153(7)EPC dated Feb. 7, 2011 for corresponding European Application No. 05 71 0780.
U.S. Non Final Office Action dated Mar. 26, 2018 for related U.S. Appl. No. 15/421,816.

* cited by examiner

ELECTRONIC DEVICE AND FUNCTION ASSIGNING METHOD

CROSS REFERENCES TO RELATED APPLICATIONS

This is a Continuation application of U.S. patent application Ser. No. 12/929,157, filed Jan. 5, 2011, which is a Continuation application of U.S. patent application Ser. No. 10/593,061, filed Feb. 12, 2007, now abandoned, which is based on a National Stage application of PCT/2005/003557, filed Feb. 24, 2005, which in turn claims priority from Japanese Application No.: 2004-075676, filed on Mar. 17, 2004, the entire contents of which are incorporated herein by reference.

TECHNICAL FIELD

The present invention relates to an electronic device, such as a video camera, a digital camera, a cellular phone, or a PDA, which has a display panel and an operating section and also to a method of assigning a function to a key.

BACKGROUND ART

As an electronic device such as a video camera is becoming small, the number of hard keys (hereinafter simply referred to as keys) tends to decrease. As a result, functions that cannot be assigned to keys need to be operated on a menu. Thus, the video camera cannot be quickly operated and there are not a lot of changes that user sees these functions. Consequently, its operation would become bothersome.

Even if many keys are provided, since the purpose for which the user uses the video camera depends on himself or herself, all functions pre-assigned to keys are not always functions that the user needs with keys.

In contrast with related art of which only one function the user desires is assigned to one key, with respect to keys of a commander as a remote controlling device for a television receiver, a technology that allows a plurality of functions to be sequentially assigned to one key whenever it is operated is described in Japanese Patent Application Unexamined Publication No. 2002-10380.

As described in Japanese Patent Application Unexamined Publication No. 2002-10380, in the method of assigning a plurality of functions that are sequentially provided to one key, although the number of keys can be decreased, functions assigned to one key are restricted. In addition, it is difficult for the user to remember functions that he or she has assigned to the key. Thus, it cannot be said that the operability is improved with the technology. In addition, since functions are not assigned to a plurality of keys, it cannot be said that the operability of the method of assigning functions is satisfactory.

Therefore, an object of the present invention is to provide an electronic device and a method of assigning functions that allow a function of quickly displaying a setting screen for menu items or a setting screen for non-menu items to be assigned to a key so as to improve the operability of the electronic device.

DISCLOSURE OF THE INVENTION

To solve the foregoing problem, the present invention is an electronic device having a display panel and a plurality of keys to which desired functions can be assigned, comprising:

displaying a plurality of items on the display panel; setting a desired item which is selected from the plurality of items; displaying a setting screen corresponding to the desired item; and setting the desired item by using the setting screen, wherein a function for displaying the setting screen when one of the keys is operated is assigned to at least one of the plurality of keys. In addition, according to the present invention, a function other than functions that can be set on a menu is assigned.

In addition, the present invention is a method of assigning desired functions to a plurality of keys, comprising the steps of:

displaying a plurality of items and selecting a desired item from the plurality of items; and selecting a key to which a function is assigned from the plurality of keys, wherein a function which has been selected at the function selecting step and which can be set on a menu is assigned to the key selected at the key selecting step. In addition, according to the present invention, a function other than functions that can be set on a menu is assigned.

BEST MODES FOR CARRYING OUT THE INVENTION

Figure 1:
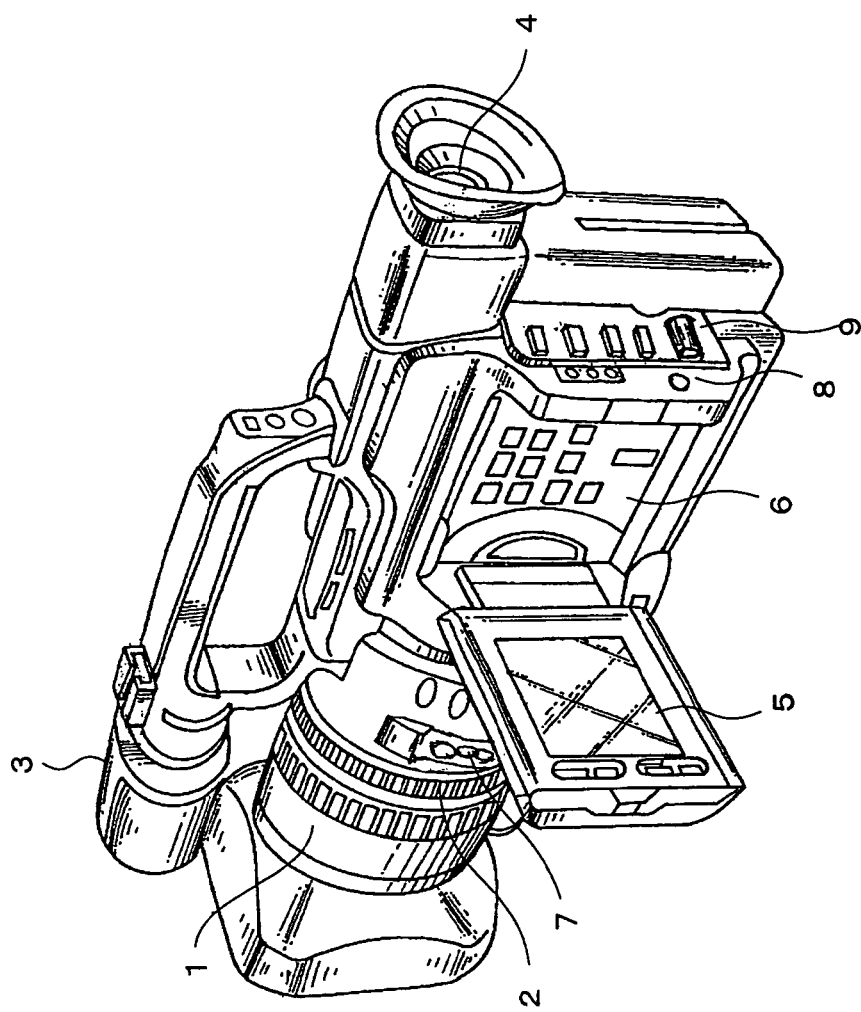
FIG. 1 is a perspective view showing an appearance of a video camera according to an embodiment of the present invention.

Next, with reference to the accompanying drawings, an embodiment of the present invention will be described. FIG. 1 shows an external structure of a video camera according to the present invention. Reference numeral 1 denotes a lens housing section. Light from an object enters an imager such as a CCD through a lens. Reference numeral 2 denotes a zoom ring. Reference numeral 3 denotes a stereo microphone. Reference numeral 4 denotes an electronic view finder.

Reference numeral 5 denotes a liquid crystal display monitor of for example 2.5 inch type. The liquid crystal display monitor 5 can be freely housed in a concave housing portion 6 on one side of the body. A tape cassette housing section (not shown) is disposed on the other side of the body. The tape cassette housing section houses for example a DV (Digital Video) standard tape cassette. An object is shot by a camera section. The resultant video signal of the object is processed. The processed video signal is recorded onto a magnetic tape of the tape cassette by a rotating head.

Figure 2:
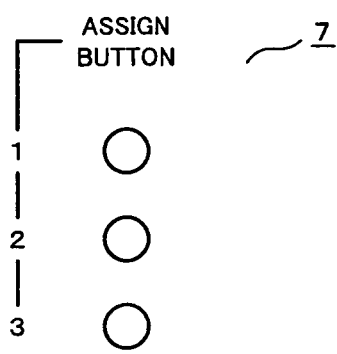
FIG. 2 is a schematic diagram showing an example of assign keys.

The video camera shown in FIG. 1 has a plurality of operation keys. Among these operation keys, assign keys 7, a menu button 8, and a selection/push-confirmation dial 9 relate to the present invention. As shown in FIG. 2, the assign keys 7 are composed of a plurality of (for example, three) assign keys (hereinafter referred to as the assign keys 1, 2, and 3). The assign keys 7 are disposed at a position where the user can easily operate them, for example, near the zoom ring 2. Thus, the assign keys 7 are apart from the other operation keys. As will be described later, the user can assign his or her desired functions to each of the assign keys 7. For example, when the user presses for example one of the assign keys 7, he or she can perform his or her desired process such as a record starting process, a tape forwarding process, a tape rewinding process, a lens-captured image process, or the like. The keys of the assign keys 7 and so forth are not limited to hard keys such as pushbutton keys, slide type keys, or pressure sensitive switches, but touch panel keys of which the user touches the liquid crystal display panel 5 with his or her finger or the like.

Figure 3:
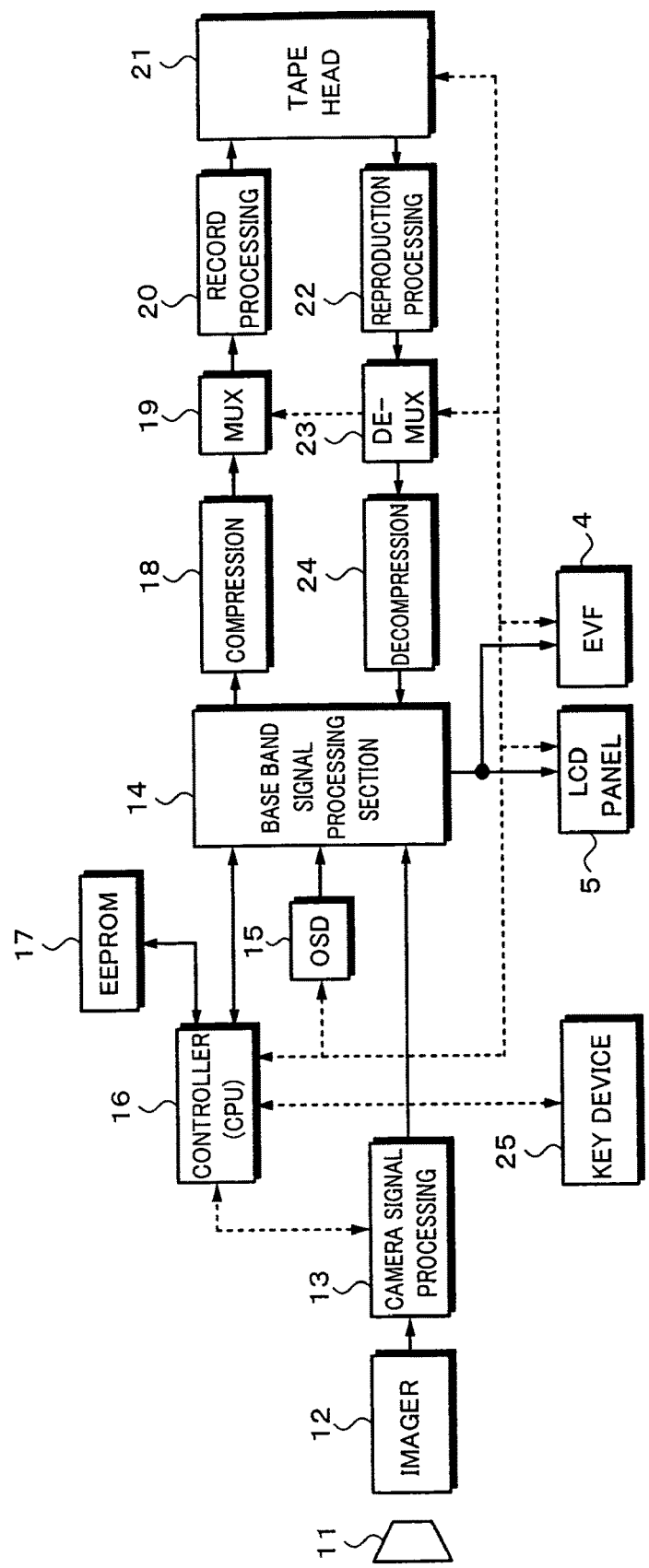
FIG. 3 is a block diagram schematically showing a structure of a signal process of the video camera.

FIG. 3 shows an outline of a structure of a signal process of the video camera. In FIG. 3, solid lines denote a path of video/audio signals, a path of a stream, and a CPU (Central Processing Unit) bus. The CPU composes a controller. Dotted lines denote a path of a control signal. Light from an object enters an imager 12 composed of a device such as a CCD (Charge Coupled Device) through a lens 11. An output signal of the imager 12 is supplied to a camera signal processing section 13. The camera signal processing section 13 performs various types of camera signal processes such as a color separating process, a digitalizing process, and so forth.

A lens-captured video signal is supplied from the camera signal processing section 13 to a base band processing section 14. An indication signal for a menu and so forth is supplied from an OSD (On Screen Display) section 15 to the base band processing section 14. The OSD section 15 generates an indication signal for a menu screen and various types of setting screens corresponding to commands supplied from a controller 16 composed of a CPU. The base band signal processing section 14 combines the indication signal supplied from the OSD section 15 and the lens-captured video signal.

Connected to the controller 16 through the CPU bus is a non-volatile memory, for example an EEPROM (Electrical Erasable Programmable ROM). An example of the non-volatile memory is a removable memory card (not shown). The CPU bus of the controller 16 is connected to the base band signal processing section 14.

A video signal supplied from the base band signal processing section 14 is compressed by a compression encoder 18 according to DCT (Discrete Cosine Transform) or the like. The compressed signal is supplied to a multiplexer 19. The multiplexer 19 multiplexes the compression-encoded audio data, system data, and so forth and generates record data. The record data are supplied to a record processing section 20.

The record processing section 20 performs an error correction encoding process, a channel coding process, and so forth. The record signal (record stream data) supplied from the record processing section 20 is supplied to a rotating head of a tape head section 21. The rotating head records the record signal as diagonal tracks on the magnetic tape.

A reproduction signal (reproduction stream data) reproduced from the magnetic tape by the rotating head of the tape head section 21 is supplied to a reproduction processing section 22. The reproduction processing section 22 performs a channel coding decoding process, an error collecting process, and so forth.

Reproduction data are supplied from the reproduction processing section 22 to a demultiplexer 23. The demultiplexer 23 separates the reproduction data into video data, audio data, and system data. A decompressing decoder 24 decompresses the compression-encoded data. The decompressed video data are supplied from the decompressing decoder 24 to the base band signal processing section 14.

The electronic view finder 4 and the liquid crystal display panel 5 are connected to the base band signal processing section 14. These display devices display a lens-captured image, a tape-reproduced image, various types of menus, and so forth. The controller 16 and a key device 25 are connected. The key device 25 includes the assign keys 7, the menu button 8, the selection/push-confirmation dial 9, and so forth. The selection/push-confirmation dial 9 is an input device of which when the dial is rotated, a selection item can be changed on a screen of the liquid crystal display panel 5 and when the dial is pushed, the selected item can be confirmed.

Next, with reference to FIG. 4, a GUI menu on which the video camera is set for various modes and a method of assigning a short cut to a desired menu item thereof will be described. The CPU of the controller 16 executes these processes according to the program. When the video camera is set, the menu button 8 is pressed. When the menu button 8, a menu screen appears on the liquid crystal display panel 5. A desired menu item, for example, "camera setting", is selected from menu items on a screen 31a shown in FIG. 4A with the selection/push-confirmation dial 9. The selected menu item is for example highlighted so that it is distinguished from the other menu items.

Menu items appear as icons on the left end of the screen. Besides "camera setting", there are menu items "audio setting", "memory setting", and "others". While the video camera is in the record pause state (record standby state), the menu screen appears. An image (not shown) that is being shot appears as a background image on the liquid crystal display panel 5.

The menu has a hierarchical structure. The menu item "camera setting" has lower hierarchical levels for example sub setting items "shake compensation", "wide setting", "progressive record", "sharpness", and "gain level". A screen 31b shown in FIG. 4B indicates the state of which "camera setting"->"shake compensation" have been selected by the selection/push-confirmation dial 9. In addition, the screen 31b indicates the current setting of "shake compensation", for example "ON". The selection/push-confirmation dial 9 is an input device of which when the dial is rotated, one of a plurality of menu items can be selected and when the dial is pushed, the selected item can be confirmed.

Figure 4C:
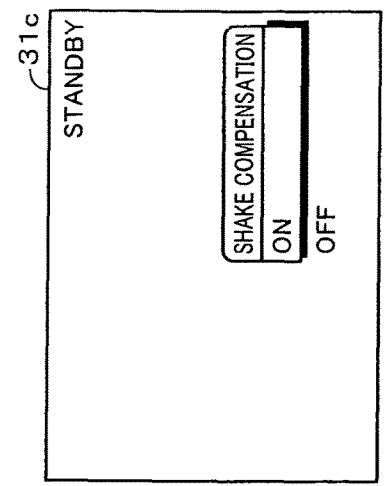
FIGS. 4A-4D are schematic diagrams showing screens appearing on a liquid crystal display panel upon settings on a menu.

After the menu item "shake compensation" has been confirmed, as shown in FIG. 4C, a "shake compensation" setting screen 31c appears. With the selection/push-confirmation dial 9, the menu item "shake compensation" can be set for a desired state. For example, "shake compensation" can be set for "ON/OFF". Likewise, another menu item can be selected. When another menu item is selected, a setting screen corresponding thereto appears. The selected menu item can be set for a desired state on the setting screen.

Figure 4D:
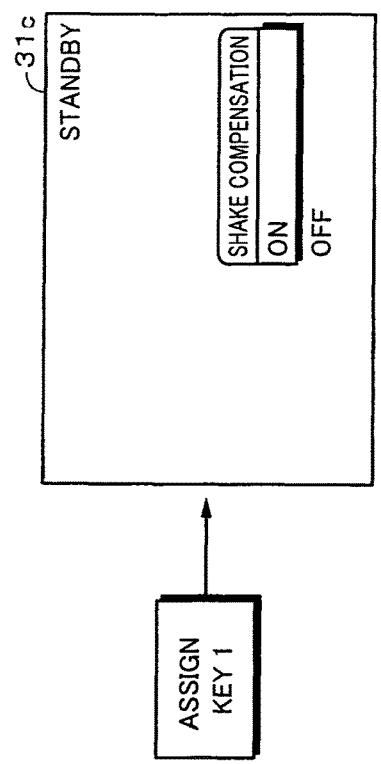
Figure 4B:
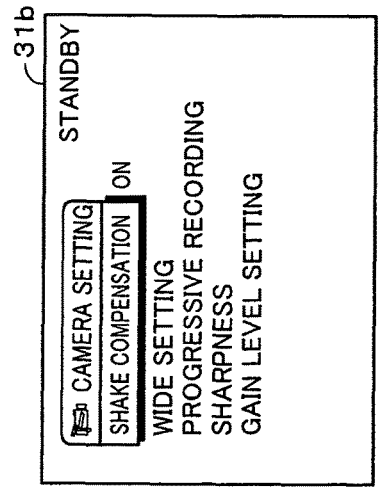
Figure 4A:
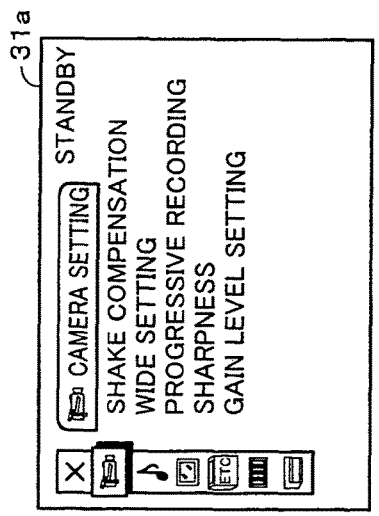

After one of the foregoing menu items, for example "shake compensation", has been assigned to one of the assign keys 7, for example the assign key 1, as shown in FIG. 4D, when the assign key 1 is operated, the shake compensation setting screen 31c quickly appears on the liquid crystal display monitor 5. In other words, the assign key 1 functions as a shortcut key of "shake compensation". Since a setting screen corresponding to a pre-assigned menu item quickly appears, even if an object is being shot by the video camera, it can be set for a desire state.

The process of assigning a function to an assign key is performed by the CPU of the controller 16 according to the program. Specifically, an assign key setting menu is selected. With the selection/push-confirmation dial 9, a function is assigned to an assign key on the assign key setting menu appearing on the liquid crystal display panel 5. In other words, by rotating the dial, an assign key to which a desired function is assigned is selected. Thereafter, the desired function is selected from the menu items. Thereafter, the dial is pushed to confirm the selected menu item.

Menu items assigned to the assign keys are not limited to those assigned with the selection/push-confirmation dial 9 on the menu. For example, a setting item of whether to display a color bar on the screen of the liquid crystal display panel 5 can be assigned to an assign key.

Figure 5:
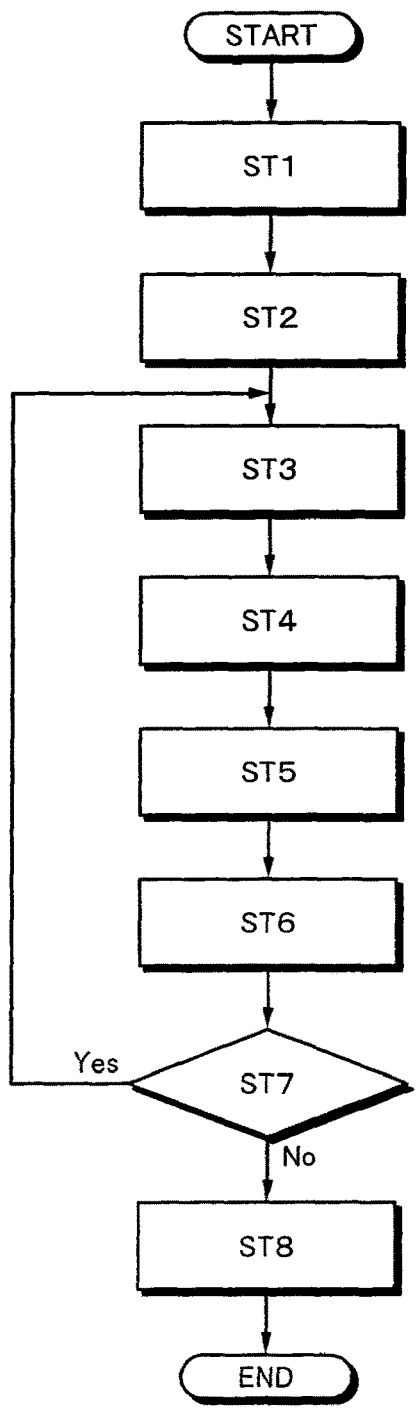
FIG. 5 is a flow chart showing a flow of an assigning process for a assign key.

According to an embodiment of the present invention, when one of paired functions is assigned to one of the plurality of assign keys, a message that prompts the user to assign the other of the pair to the assign key appears. Next, with reference to a flow chart shown in FIG. 5 and display screens of the liquid crystal display panel 5 shown in FIG. 6, a function assigning process for assign keys will be described.

At step ST1, the menu button 8 is pressed. The menu appears on the liquid crystal display panel 5. A plurality of menu items appear on the menu screen. At step ST2, "changing user setting" is selected from the menu items. Since the assign keys 7 are composed of three assign keys, at step ST3, key selection step, an assign key to which the selected function is assigned is selected.

Figure 6A:
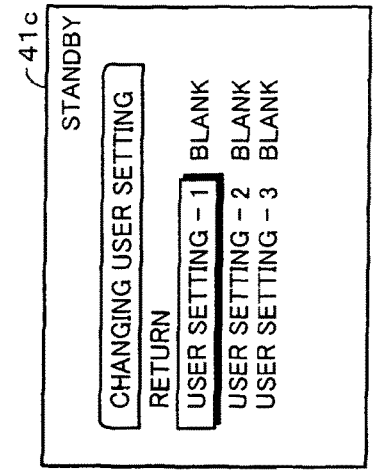
FIGS. 6A-6F are schematic diagrams showing an example of screens appearing on the liquid crystal display panel in an assigning process for an assign key.
Figure 6B:
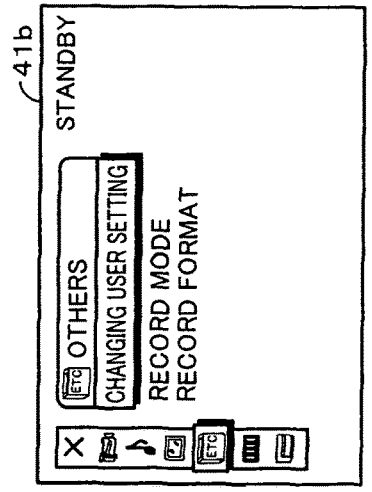
Figure 6C:
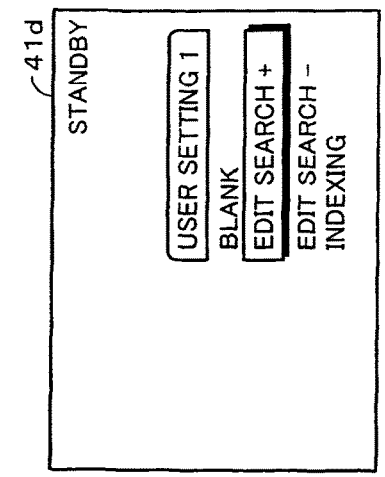

When the menu button 8 is pressed, the menu screen appears. When the menu item "others" is selected on the menu screen, a screen 41a appears. FIG. 6A shows the screen 41a. The menu item "others" has sub menu items "changing user setting", "record mode", and "record format". When "changing user setting" is selected, a screen 41b shown in FIG. 6B appears. When "changing user setting" is confirmed, a key selection screen 41c shown in FIG. 6C appears. The menu "changing user setting" is a menu on which menu items are assigned to the assign keys 7.

On the key selection screen 41c, "user setting 1" denotes a menu item assigned to the assign key 1; and "user setting 2" and "user setting 3" denote menu items assigned to the assign key 2 and the assign key 3, respectively. On the key selection screen 41c shown in FIG. 6C, all the user settings have been assigned "blank". In other words, no executable functions have been assigned to these assign keys. Since the assign keys can be assigned "blank", if the user does not need to assign functions to the assign keys, even if he or she mistakenly touches these assign keys, the video camera can be prevented from malfunctioning. In addition, the same function can be assigned to the plurality of assign keys.

At step ST4, function selection step, when the selection/push-confirmation dial 9 is rotated, a desired function to be assigned is selected. At step ST5, when the selection/push-confirmation dial 9 is pushed, the selected function is assigned to the selected assign key. Functions assigned to the assign keys are not limited to functions assigned with the menu button 8 and the selection/push-confirmation dial 9 on the menu, but functions that can be assigned to only the assign keys. When one of functions that can be assigned with the menu button 8 and the selection/push-confirmation dial 9 is assigned to an assign key, the assign key functions as a short cut key.

Figure 6D:
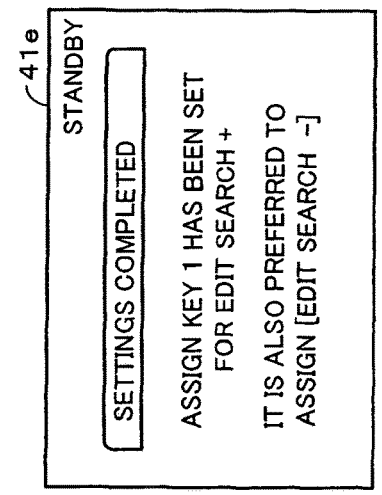

When "user setting 1" is selected on the key selection screen 41c, it is changed to a function selection screen 41d shown in FIG. 6D. On the function selection screen 41d, as selectable menu items, there are for example "blank", "edit search +", "edit search −", and "indexing". "Edit search +" is a function of reproducing the tape forwards in the record pause state. In contrast "edit search −" is a function of reproducing the tape backwards in the record pause state. These functions exemplify paired functions. Other examples of paired functions are "tel/wide", and "focus ±".

Figure 6E:
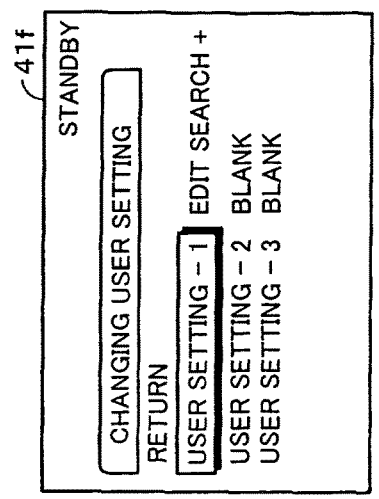

After step ST4, function assignment, a setting result information screen appears (at step ST5). In FIG. 6D, when "user setting 1" is set for e.g. "edit search +", a setting result information screen 41e appears as shown in FIG. 6E. The screen 41 indicates that the setting has been completed and that the function "edit search +" has been assigned to the assign key 1. In addition, the screen 41 indicates a message that prompts the user to assign the other function of the paired functions, namely "edit search". Instead of the assignment prompt menu, the paired function may be automatically assigned to another assign key.

Figure 6F:
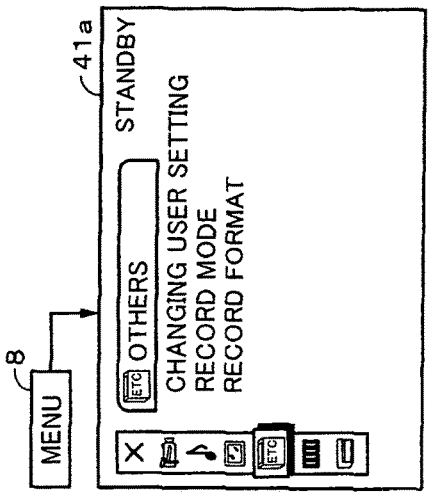

A predetermined wait time, for example, five seconds, is preset for the setting result information screen 41e. After the wait time has elapsed, as shown in FIG. 6F, a key selection screen 41f that indicates assigned results of the assign keys 7 appears. In contrast with the key selection screen 41c, the key selection screen 41f indicates the latest assigned states of the assign keys.

At step ST6, the latest assign key information is stored to a non-volatile memory (EEPROM 17). At step ST7, it is determined whether to perform a function assigning process for another assign key. When the assigning process is continued, the flow returns to step ST3 (selection of an assign key to which a function is assigned). To quit the assigning process, the menu button 8 is pressed and the menu is closed (at step ST8).

Functions assigned to the assign keys 7 can be deleted. In addition, functions assigned to two assign keys can be changed with each other. FIG. 7 describes this changing process.

Figure 7A:
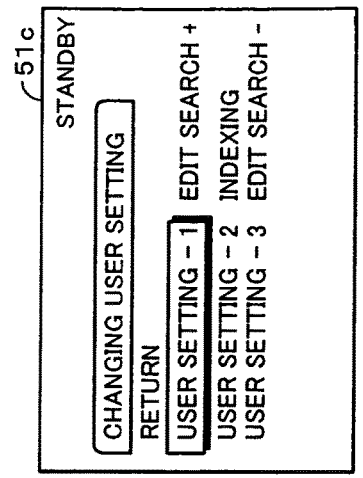
FIGS. 7A-7E are schematic diagrams showing another example of screens appearing on the liquid crystal display panel in an assigning process for an assign key.
Figure 7B:
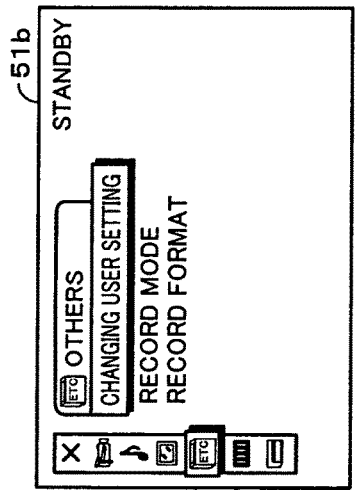
Figure 7C:
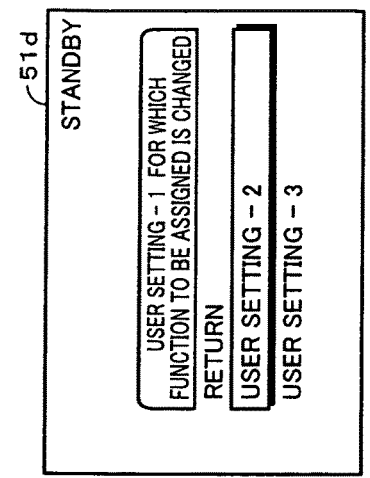
Figure 7D:

When the menu button 8 is pressed, the menu screen appears. When the menu item "others" is selected on the menu screen, a screen 51a appears. FIG. 7A shows the screen 51a. The menu item "others" has a sub menu item "changing user setting". When the menu item "changing user setting" is selected, a screen 51b shown in FIG. 7B appears. When the menu item "changing user setting" is confirmed, a key selection screen 51c shown in FIG. 7C appears.

The key selection screen 51c indicates functions currently assigned to the function keys. For example, the function "edit search +" has been assigned to the assign key 1. The function "indexing" has been assigned to the assign key 2. The function "edit search −" has been assigned to the assign key 3.

Figure 7E:
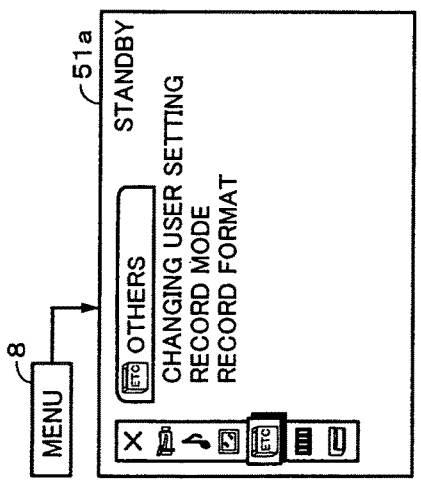

When the user setting 1 (assign key 1) is selected on the key selection screen 51c and confirmed, an assigned function changing screen 51d appears. When the user setting 1 (assign key 2) is selected and confirmed on the assigned function changing screen 51d, a process of changing the functions of the user settings 1 and 2 with each other is performed. As shown in FIG. 7E, the function assigned to the user setting 1 and the function assigned to the user setting 2 have been changed to "indexing" and "edit search +", respectively. The changed results are written to the non-volatile memory.

According to an embodiment of the present invention, a sequence of operations that the user performed can be stored and assigned to one of the plurality of assign keys. For example, as a menu item, "start of storing a sequence of video camera operations" is prepared. After the storing operation stare is tuned on, when one of blank assign keys is pressed, the storing operation is started. A sequence of video camera operations performed after the assign key is pressed until it is pressed again are stored to the non-volatile memory. After the sequence has been stored, when the assign key is pressed, the same sequence of operations that have been stored are performed.

After a sequence of operations have been stored, when only the assign key is pressed, the operations can be executed. Thus, since a sequence of operations that the user often uses can be executed only by pressing only the assign key, the video camera can be easily operated in an emergency situation or the like.

Thus, unlike the case that a menu is opened, a menu item is selected from a plurality of menu items on the menu for each of a plurality of keys, the selected key is set for the selected menu item on a setting screen corresponding thereto, when a key is operated, a setting screen for a selected item quickly appears. As a result, since a shortcut function can be accomplished, the number of operation steps necessary for the setting can be decreased. In addition, according to an embodiment of the present invention, a function for displaying a setting screen for unique items other than menu items selected on the menu can be assigned to each of the plurality of keys. In addition, since a setting screen quickly appears, settings can be quickly changed.

In the foregoing, an embodiment of the present invention has been specifically described. However, the present invention is not limited to the foregoing embodiment. Instead, various modifications corresponding to the spirit of the present invention may be made. For example, the key selecting step and the function assigning step can be changed with each other. In addition, the present invention can be widely applied to various types of electronic devices that have a display panel on which a menu appears besides a video camera.

DESCRIPTION OF REFERENCE NUMERALS

1 LENS HOUSING SECTION
2 ZOOM RING
3 STEREO MICROPHONE
4 ELECTRONIC VIEW FINDER
5 LIQUID CRYSTAL DISPLAY PANEL
6 CONCAVE HOUSING PORTION
7 ASSIGN KEYS
8 MENU BUTTON
9 SELECTION/PUSH-CONFIRMATION DIAL
11 LENS
12 IMAGER
13 CAMERA SIGNAL PROCESSING SECTION
14 BASE BAND SIGNAL PROCESSING SECTION
15 OSD SECTION
16 CONTROLLER
17 EEPROM
18 COMPRESSION ENCODER
19 MULTIPLEXER
20 RECORD PROCESSING SECTION
21 TAPE HEAD SECTION
22 REPRODUCTION PROCESSING SECTION
23 DEMULTIPLEXER
24 DECOMPRESSING DECODER
25 KEY DEVICE
ST1 PRESS MENU KEY (OPEN MENU).
ST2 SELECT "CHANGING USER SETTING" FROM ITEMS.
ST3 SELECT ASSIGN KEY TO WHICH FUNCTION IS ASSIGNED.
ST4 SELECT FUNCTION TO BE ASSIGNED AND ASSIGN SELECTED FUNCTION.
ST5 SETTING RESULT INDICATION SCREEN APPEARS.
ST6 BACK UP LATEST ASSIGN KEY INFORMATION TO NON-VOLATILE MEMORY.
ST7 CONTINUE TO ASSIGN FUNCTION TO KEY ?
ST8 PRESS MENU KEY (CLOSE MENU).

The invention claimed is:

1. An apparatus, comprising:
image display circuitry configured to:
 display of a plurality of items on a display; and
control circuitry configured to:
 assign a first function to a first operating part selected from a plurality of operating parts by a user, the first function being associated with an item selected from the plurality of items;
 assign a second function to a second operating part based on the selection of the item, the second function being a correlated function to the first function, the second function being associated with the item selected from the plurality of items; and
 automatically exchange the assigned first and second functions with each other based on an operation by a user on the display, such that the apparatus changes from a first state in which the first function is assigned to the first operating part and the second function is assigned to the second operating part to a second state in which the first function is assigned to the second operating part and the second function is assigned to the first operating part.

2. The apparatus of claim 1,
wherein the second function is an opposite function of the first function.

3. The apparatus of claim 1,
wherein a sequence of operations that the user has performed are stores as a user-defined function, and the user-defined function is assigned to one of the plurality of operating parts.

4. The apparatus of claim 1,
wherein the plurality of operating parts are mechanical keys.

5. The apparatus of claim 1, further comprising the display.

6. The apparatus of claim 1,
wherein the control circuitry is further configured to change between an operation mode and a setting mode, the setting mode enabling the assignment of the first function to the first operating part and the assignment of the second function to the second operating part.

7. The apparatus of claim 1,
wherein the first operating part is a mechanical key and the second operating part is a touch panel key.

8. A non-transitory computer readable medium storing program code, the program code being executable by an apparatus to perform operations comprising:
controlling a display of a plurality of items on a display;

assigning a first function to a first operating part selected from a plurality of operating parts by a user, the first function being associated with an item selected from the plurality of items;

assigning a second function to a second operating part based on the selection of the item, the second function being a correlated function to the first function, the second function being associated with the item selected from plurality of items; and automatically exchanging the assigned first and second functions with each other based on an operation by a user on the display, such that the apparatus changes from a first state in which the first function is assigned to the first operating part and the second function is assigned to the second operating part to a second state in which the first function is assigned to the second operating part and the second function is assigned to the first operating part.

9. The non-transitory computer readable medium of claim 8,
wherein the second function is an opposite function of the first function.

10. The non-transitory computer readable medium of claim 8, further comprising:
storing as a user-defined function a sequence of operations that the user has performed, and
assigning the user-defined function to one of the plurality of operating parts.

11. The non-transitory computer readable medium of claim 8,
wherein the plurality of operating parts are mechanical keys.

12. The non-transitory computer readable medium of claim 8, further comprising:
changing between an operation mode and a setting mode, the setting mode enabling the assignment of the first function to the first operating part and the assignment of the second function to the second operating part.

13. The non-transitory computer readable medium of claim 8,
wherein the first operating part is a mechanical key and the second operating part is a touch panel key.

14. A method of operating an apparatus, comprising:
controlling, by an image display circuitry, a display of a plurality of items on a display;
assigning, by a control circuitry, a first function to a first operating part selected from a plurality of operating parts by a user, the first function being associated with an item selected from the plurality of items;
assigning, by the control circuitry, a second function to a second operating part based on the selection of the item, the second function being a correlated function to the first function, the second function being associated with the item selected from the plurality of items; and
automatically exchanging, by the control circuitry, the assigned first and second functions with each other based on an operation by a user on the display, such that the apparatus changes from a first state in which the first function is assigned to the first operating part and the second function is assigned to the second operating part to a second state in which the first function is assigned to the second operating part and the second function is assigned to the first operating part.

15. The method of claim 14,
wherein the second function is an opposite function of the first function.

16. The method of claim 14, further comprising:
storing, by a memory, as a user-defined function a sequence of operations that the user has performed, and
assigning, by the control circuitry, the user-defined function to one of the plurality of operating parts.

17. The method of claim 14,
wherein the plurality of operating parts are mechanical keys.

18. The method of claim 14, further comprising:
changing, by the control circuitry, between an operation mode and a setting mode, the setting mode enabling the assignment of the first function to the first operating part and the assignment of the second function to the second operating part.

19. The method of claim 14,
wherein the first operating part is a mechanical key and the second operating part is a touch panel key.

* * * * *